(12) United States Patent  
Mogi et al.

(10) Patent No.: US 11,105,413 B2  
(45) Date of Patent: Aug. 31, 2021

(54) GEAR POSITION MEASURING DEVICE FOR SEQUENTIAL TRANSMISSION

(71) Applicant: Honda Motor Co., Ltd., Tokyo (JP)

(72) Inventors: Akira Mogi, Kumamoto (JP); Atsuki Sato, Kumamoto (JP)

(73) Assignee: HONDA MOTOR CO., LTD., Tokyo (JP)

( * ) Notice: Subject to any disclaimer, the term of this patent is extended or adjusted under 35 U.S.C. 154(b) by 406 days.

(21) Appl. No.: 16/368,504

(22) Filed: Mar. 28, 2019

(65) Prior Publication Data

US 2019/0301595 A1 Oct. 3, 2019

(30) Foreign Application Priority Data

Mar. 29, 2018 (JP) .............................. JP2018-064876

(51) Int. Cl.
| | |
|---|---|
| *F16H 59/10* | (2006.01) |
| *F16H 59/70* | (2006.01) |
| *F16H 63/16* | (2006.01) |
| *F16H 63/42* | (2006.01) |
| *F16H 59/02* | (2006.01) |

(52) U.S. Cl.
CPC ....... *F16H 59/105* (2013.01); *F16H 59/0204* (2013.01); *F16H 59/70* (2013.01); *F16H 63/16* (2013.01); *F16H 63/42* (2013.01); *F16H 2059/706* (2013.01)

(58) Field of Classification Search
CPC .......................... F16H 63/16; F16H 2059/706
See application file for complete search history.

(56) References Cited

U.S. PATENT DOCUMENTS

| 6,223,112 B1 | 4/2001 | Nishino | |
|---|---|---|---|
| 9,435,426 B2* | 9/2016 | Ebata | .................... F16H 59/044 |
| 2015/0006042 A1* | 1/2015 | Hotei | ..................... F16H 59/70 |
| | | | 701/51 |

FOREIGN PATENT DOCUMENTS

| CN | 205001499 U | 1/2016 |
|---|---|---|
| JP | 2007-232022 A | 9/2007 |

* cited by examiner

*Primary Examiner* — Timothy Hannon  
(74) *Attorney, Agent, or Firm* — Birch, Stewart, Kolasch & Birch, LLP (57) ABSTRACT

The gear position measuring device includes a switch, an output unit, a processor, and a storage. The switch includes multiple individual contacts respectively corresponding to the multiple gear positions. The multiple individual contacts are separated into multiple gear position groups that include at least two of the multiple individual contacts. The output unit includes circuits so that the individual contacts for the gear positions of each of the multiple gear position groups are connected to the same circuit, thereby being able to output from the circuits that are different for each of the multiple gear position groups. When an output value from the output unit is changed, the processor determines a current gear position on the basis of the gear position stored in the storage and the multiple gear positions corresponding to the output value from the output unit.

12 Claims, 4 Drawing Sheets

GEAR POSITION MEASURING DEVICE FOR SEQUENTIAL TRANSMISSION

BACKGROUND

1. Technical Field

The present invention relates to a gear position measuring device for a sequential transmission. The gear position measuring device measures a gear position of a sequential transmission having multiple gear positions that are able to be selectively established.

2. Description of the Background

Patent Literature 1 discloses a gear position measuring device for a sequential transmission. This gear position measuring device determines a current gear position on the basis of an output resistance value that differs each time a gear position is shifted in accordance with rotation of a shift drum of the sequential transmission.

CITATION LIST

Patent Literature

Patent Literature 1: Japanese Unexamined Patent Application Laid-Open No. 2007-232022

BRIEF SUMMARY

The gear position measuring device that is disclosed in Patent Literature 1 requires resistances in the number corresponding to the number of gear positions. This generates the need for a space for disposing a lot of resistances and causes enlargement of the gear position measuring device as well as increases cost.

The present invention has been achieved in view of these circumstances, and an object of the present invention is to provide a small-sized gear position measuring device for a sequential transmission at a lower cost.

To achieve the above-described object, the present invention includes a first feature in which a gear position measuring device for a sequential transmission includes a switch, an output unit, a storage, and a processor. The sequential transmission has multiple gear positions that are able to be selectively established. The gear position measuring device measures the gear position of the sequential transmission. The switch includes multiple individual contacts respectively corresponding to the multiple gear positions. The multiple individual contacts are changed from an off-state to an on-state in accordance with the selective establishment of the multiple gear positions. The output unit includes circuits so that the individual contacts for the gear positions of each of multiple gear position groups are connected to the same circuit, thereby being able to output from the circuits that are different for each of the multiple gear position groups. The multiple gear position groups respectively includes at least two of the multiple gear positions. The storage stores a determined gear position. When an output value from the output unit is changed, the processor determines a current gear position on the basis of the gear position stored in the storage and the multiple gear positions indicated by the output value from the output unit.

In addition to the first feature, the present invention may also include the following second feature. That is, the gear position measuring device may further include a display and an electric power supply unit. The display displays a determined gear position. The electric power supply unit starts and stops supply of electric power to the processor. The processor may make the storage store the determined gear position and also make the display display the determined gear position. The processor may be activated by turning on the electric power supply unit to perform the following processes. That is, when an output value from the output unit corresponds to the gear position stored in the storage, the processor determines the gear position that is stored in the storage, as a current gear position. When an output value from the output unit indicates the gear position other than the gear position stored in the storage, the processor makes the display display this result.

In addition to the second feature, the present invention may also include the following third feature. That is, among the multiple gear positions of the sequential transmission, one gear position may be set as a reference gear position. The output unit may include a circuit for one of the multiple individual contacts of the switch, which corresponds to the reference gear position. The circuit outputs an output value that is different from those from the multiple circuits for the respective multiple gear position groups. The processor may make the display display the reference gear position when the output unit outputs an output value indicating the reference gear position.

In addition to the second or the third feature, the present invention may also include the following fourth feature. That is, the electric power supply unit may stop supply of electric power to the processor when a predetermined time has passed after a main switch is turned off.

In addition to any one of the second to the fourth features, the present invention may also include the following fifth feature. That is, the processor may also determine a current gear position on the basis of an output value from the output unit, a number of rotation of a power source mounted on a vehicle, and a speed of the vehicle.

In addition to the third feature, the present invention may also include the following sixth feature. That is, the output unit may include a first circuit for a neutral position, which is the reference gear position, a second circuit for a first gear position group, a third circuit for a second gear position group, and a fourth circuit for a third gear position group. The first gear position group includes a first gear position and a gear position of an integer multiple of (1+3). The second gear position group includes a second gear position and a gear position of an integer multiple of (2+3). The third gear position group includes a third gear position and a gear position of an integer multiple of (3+3).

In addition to the sixth feature, the present invention may also include the following seventh feature. That is, the second to the fourth circuits may have resistance values that are different from each other and output predetermined respective resistance values as output values.

In addition to any one of the first to the seventh features, the present invention may also include an eighth feature in which the switch turns on and off the multiple individual contacts in accordance with rotation of a shift drum of the sequential transmission.

In the first feature of the present invention, the switch includes the multiple individual contacts respectively corresponding to the multiple gear positions. The multiple gear positions are separated into multiple gear position groups that include at least two of the multiple gear positions. The output unit includes the circuits so that the individual contacts for the gear positions of each of multiple gear position groups are connected to the same circuit, thereby being able to output from the circuits that are different for each of the multiple gear position groups. When an output value from the output unit is changed, the processor determines a current gear position on the basis of the gear position stored in the storage and the multiple gear positions corresponding to the output value from the output unit. This structure requires only circuits for the respective gear position groups, thereby enabling reduction in dimensions and in cost compared with an existing device having circuits for respective gear positions.

In the second feature of the present invention, the processor makes the storage store the determined gear position and also makes the display display the determined gear position. The processor is activated by turning on the electric power supply unit, which turns on and off the supply of electric power to the processor, to perform the following processes. That is, when an output value from the output unit corresponds to the gear position stored in the storage, the processor determines the gear position that is stored in the storage, as a current gear position. When an output value from the output unit indicates the gear position other than the gear position stored in the storage, the processor makes the display display this result. Thus, the storage stores the current gear position, thereby enabling a correct determination of the gear position at the next time when the output value is changed. Moreover, determining the gear position at the time of starting the supply of electric power to the processor enables notifying a user that the current gear position is undetermined, when the gear position is changed by changing gears after the supply of electric power is stopped.

In the third feature of the present invention, the circuit for one of the individual contacts of the switch, which corresponds to the reference gear position, outputs an output value that is different from those from the multiple circuits for the respective multiple gear position groups. The processor makes the display display the reference gear position when the output unit outputs the output value indicating the reference gear position. Thus, setting the reference gear position for which the output value is independently set enables more correct determination and displaying of the gear position.

In the fourth feature of the present invention, the supply of electric power to the processor is stopped when a predetermined time has passed after the main switch is turned off. Conversely, the supply of electric power to the processor continues until the predetermined time passes even after the main switch is turned off. Thus, for example, even in a case in which the gear position is shifted to the first gear position when a user notices a tilt of a road surface after the user stops the vehicle by changing the gear position to the neutral position, the storage stores the first gear position as the current gear position. This avoids inconsistency between the gear position stored in the storage and a gear position when the main switch is turned on by the user next time.

In the fifth feature of the present invention, the processor is able to determine the current gear position on the basis of the output value from the output unit, the number of rotation of the power source mounted on the vehicle, and the speed of the vehicle. That is, the gear position is able to be determined on the basis of the state of the vehicle that is traveling. This structure enables storing and displaying the gear position more correctly even when the vehicle starts running while the gear position is still not determined or even when the determination of the gear position is failed during traveling.

In the sixth feature of the present invention, the output unit includes the first circuit for the neutral position, the second circuit for the first gear position and the gear position of an integer multiple of (1+3), the third circuit for the second gear position and the gear position of an integer multiple of (2+3), and the fourth circuit for the third gear position and the gear position of an integer multiple of (3+3). Thus, the output unit provides an output value that is different depending on whether the gear position is shifted up or down by one from the current gear position in changing gear positions sequentially, using the least number of circuits.

In the seventh feature of the present invention, the second to the fourth circuits have the resistance values that are different from each other and output the predetermined respective resistance values as output values. That is, the output value is changed by using such a simple structure.

In the eighth feature of the present invention, the switch turns on and off the multiple individual contacts in accordance with rotation of the shift drum. Thus, the gear position is sequentially changed in accordance with rotation of the shift drum, thereby enabling more reliable measurement of the gear position.

DETAILED DESCRIPTION

Figure 1:
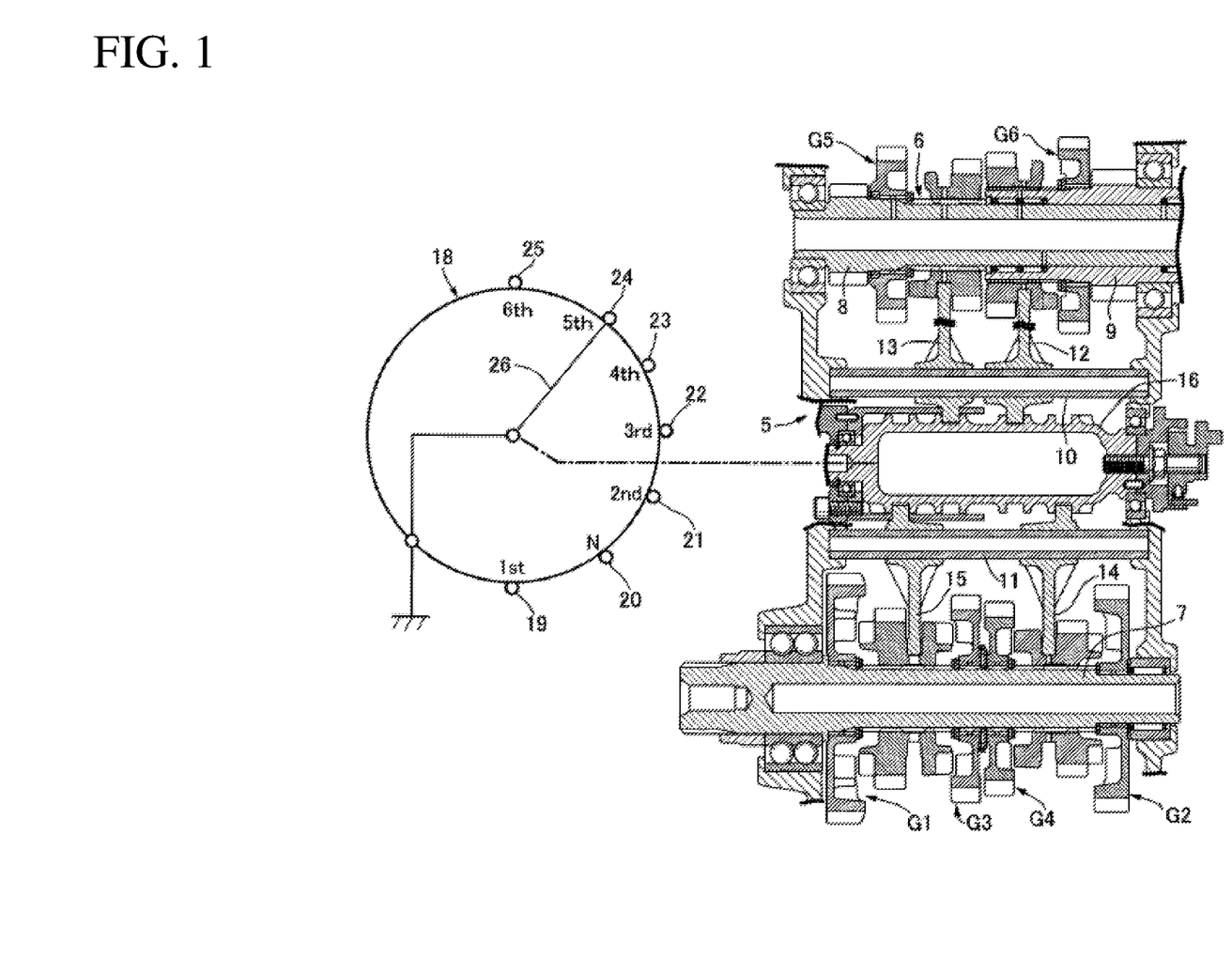
FIG. 1 illustrates a principal part of a sequential transmission.

An embodiment of the present invention will be described with reference to the attached FIGS. 1 to 4. FIG. 1 illustrates a sequential transmission 5, which may be mounted on a motorcycle, for example. The sequential transmission 5 includes a main shaft 6 and a counter shaft 7 that have gear trains for multiple gear positions that are able to be selectively established, therebetween. For example, gear trains G1 to G6 respectively for first to sixth gear positions are provided.

The main shaft 6 and the counter shaft 7 have parallel axes. The main shaft 6 includes a first shaft 8 and a second shaft 9 for coaxially inserting the first shaft 8 in a relatively rotatable manner. The gear train G1 for the first gear position, the gear train G3 for the third gear position, and the gear train G5 for the fifth gear position are provided between the first shaft 8 and the counter shaft 7. The gear train G2 for the second gear position, the gear train G4 for the fourth gear position, and the gear train G6 for the sixth gear position are provided between the second shaft 9 and the counter shaft 7.

A first shift fork shaft 10 is provided parallel to the main shaft 6 and the counter shaft 7 and slidably supports a first shift fork 12 and a second shift fork 13. A second shift fork shaft 11 is provided parallel to the first shift fork shaft 10 and slidably supports a third shift fork 14 and a fourth shift fork 15. A shift drum 16 is provided so as to be rotatable around an axis parallel to the main shaft 6 and the counter shaft 7 and has an outer circumferential surface with which the first to the fourth shift forks 12 to 15 are engaged. The sequential transmission 5 establishes the first gear position, a neutral position, the second gear position, the third gear position, the fourth gear position, the fifth gear position, and the sixth gear position, in this order, in accordance with rotation of the shift drum 16.

A switch 18 is provided interlockably with the shift drum 16 to change switch states in accordance with rotation of the shift drum 16. The switch 18 has multiple individual contacts respectively corresponding to the multiple gear positions. The multiple individual contacts are changed from an off-state to an on-state in accordance with the selective establishment of the multiple gear positions. That is, the switch 18 includes an individual contact 19 for the first gear position, an individual contact 20 for the neutral position, an individual contact 21 for the second gear position, an individual contact 22 for the third gear position, an individual contact 23 for the fourth gear position, an individual contact 24 for the fifth gear position, and an individual contact 25 for the sixth gear position, with which a grounded movable contact 26 is sequentially brought into conduction, in accordance with rotation of the shift drum 16.

Figure 2:
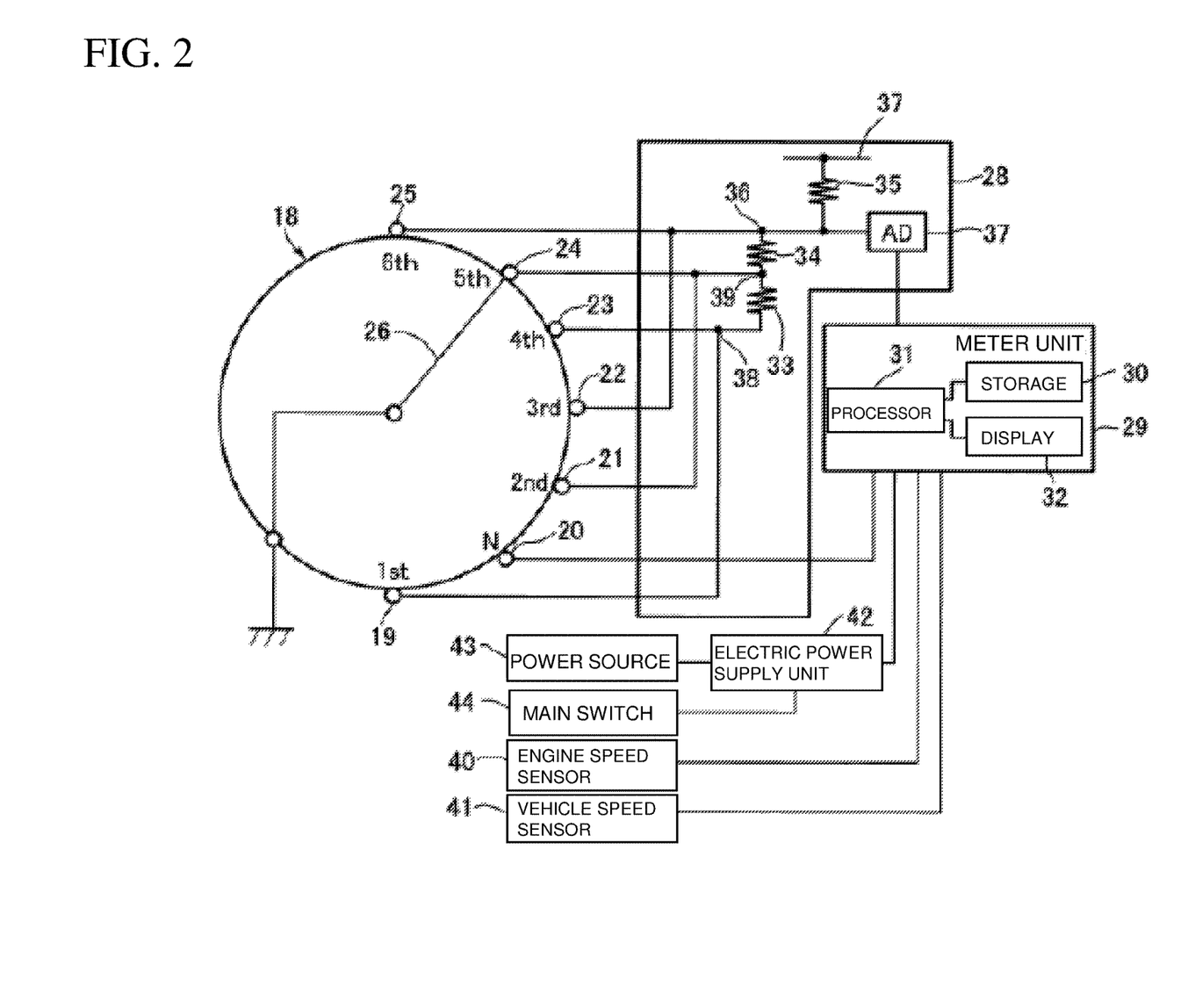
FIG. 2 illustrates a configuration of a gear position measuring device.

FIG. 2 illustrates a gear position measuring device including the switch 18, an output unit 28, and a meter unit 29 that receives an output value from the output unit 28. The meter unit 29 includes a storage 30, a processor 31, and a display 32. The storage 30 stores a determined gear position. When the output value from the output unit 28 is changed, the processor 31 determines a current gear position on the basis of the gear position stored in the storage 30 and the multiple gear positions corresponding to the output value from the output unit 28. The display 32 displays the determined gear position.

Among the multiple gear positions of the sequential transmission 5, the neutral position is set as a reference gear position. The first to the sixth gear positions except for the neutral position, which functions as the reference gear position, are separated into multiple gear position groups that respectively include at least two of the multiple gear positions. That is, the multiple gear positions are separated into three groups: a first gear position group including the first gear position and a gear position of an integer multiple of (1+3), a second gear position group including the second gear position and a gear position of an integer multiple of (2+3), and a third gear position group including the third gear position and a gear position of an integer multiple of (3+3). In this embodiment, the first gear position group includes the first and the fourth gear positions, the second gear position group includes the second and the fifth gear positions, and the third gear position group includes the third and the sixth gear positions.

The individual contact 19 for the first gear position and the individual contact 23 for the fourth gear position of the switch 18 correspond to the first gear position group. The individual contact 21 for the second gear position and the individual contact 24 for the fifth gear position of the switch 18 correspond to the second gear position group. The individual contact 22 for the third gear position and the individual contact 25 for the sixth gear position of the switch 18 correspond to the third gear position group.

The output unit 28 includes circuits so that the individual contacts for the gear positions of each of the first to the third gear position groups are connected to the same circuit, thereby being able to output from circuits that are different for each of the first to the third gear position groups.

More specifically, the output unit 28 includes a first resistance 33, a second resistance 34, a third resistance 35, and an AD converter circuit 37 and sends an output value from the AD converter circuit 37 to the processor 31. The first resistance 33 and the second resistance 34 are serially connected between the individual contact 19 for the first gear position and the individual contact 25 for the sixth gear position. The third resistance 35 is interposed between a first connection point 36 and a power source line 37. The first connection point 36 exists between the second resistance 34 and the individual contact 24 for the fifth gear position. The AD converter circuit 37 is connected to the first connection point 36.

The individual contact 23 for the fourth gear position for the first gear position group is connected to a second connection point 38 between the individual contact 19 for the first gear position of the first gear position group and the first resistance 33. The individual contact 21 for the second gear position and the individual contact 24 for the fifth gear position, for the second gear position group, are connected to a third connection point 39 between the first resistance 33 and the second resistance 34. The individual contact 22 for the third gear position for the third gear position group is connected to the first connection point 36 between the individual contact 25 for the sixth gear position for the third gear position group and the second resistance 34. The individual contact 20 for the neutral position is directly connected to the processor 31.

Thus, the output unit 28 has a first circuit for the neutral position, a second circuit passing through the first resistance 33 and the second resistance 34, a third circuit passing through the second resistance 34, and a fourth circuit passing through no resistance. The second circuit is used when either one of the first and the fourth gear positions of the first gear position group is established. The third circuit is used when either one of the second and the fifth gear positions of the second gear position group is established. The fourth circuit is used when either one of the third and the sixth gear positions of the third gear position group is established.

The first circuit sends a signal that indicates an open state or a grounded state, to the processor 31. The second to the fourth circuits have resistance values that are different from each other and output predetermined respective resistance values as output values. In one example, when either one of the first and the fourth gear positions of the first gear position group is established, the second circuit outputs a first resistance value A ($\Omega$), for example, "880$\Omega$". In another example, when either one of the second and the fifth gear positions of the second gear position group is established, the third circuit outputs a second resistance value B ($\Omega$), for example, "200$\Omega$". In yet another example, when either one of the third and the sixth gear positions of the third gear position group is established, the fourth circuit outputs a third resistance value C ($\Omega$), for example, "0$\Omega$".

When the output value from the output unit 28 is changed, the processor 31 determines a current gear position on the basis of the gear position stored in the storage 30 and the multiple gear positions indicated by the output value from the output unit 28. For example, when newly receiving the second resistance value B ($\Omega$) corresponding to the second gear position group from the output unit 28 in a condition in which the storage 30 stores the first gear position, the processor 31 determines the second gear position as the current gear position and displays this result on the display 32. The processor 31 also receives a number of rotation of an engine or an electric motor, which is a power source mounted on a vehicle, from an engine speed sensor 40, and also further receives a speed of the vehicle from a vehicle speed sensor 41. For example, the processor 31 receives a number of rotation of an engine.

Supply of electric power from a power source 43 to the processor 31 is controlled by turning on and off an electric power supply unit 42. The processor 31 is activated by turning on the electric power supply unit 42, to execute a process in accordance with the process procedure illustrated in FIG. 3. More specifically, the processor 31 executes the following steps in this order: in a first step S1, the processor 31 makes the display 32 display a gear position that is stored in the storage 30 last time when the electric power supply unit 42 is turned off, in a second step S2, the processor 31 determines whether the neutral position is established, on the basis of the gear position stored in the storage 30 and the output value from the output unit 28, and in a third step S3, the processor 31 makes the display 32 display that the current gear position is the neutral position if the processor 31 determines that the neutral position is established. If the processor 31 determines that the neutral position is not established in the second step S2, the processor 31 makes a display on the display 32 blinks in a fourth step S4.

Figure 3:
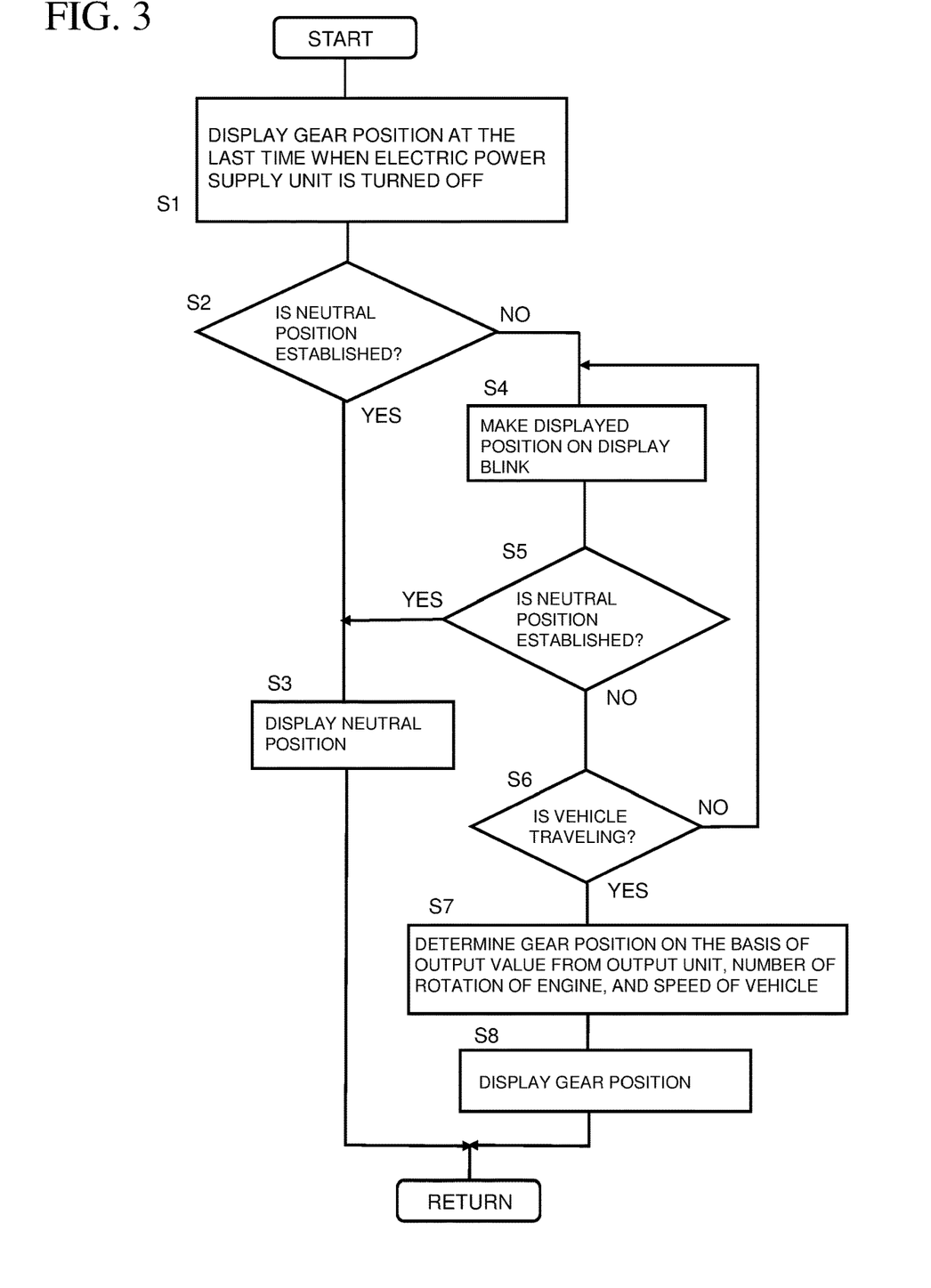
FIG. 3 is a flowchart showing a procedure of a process performed when supply of electric power is started.

In other words, the processor 31 determines the gear position that is stored in the storage 30, as the current gear position, when the output value from the output unit 28 corresponds to the gear position stored in the storage 30. On the other hand, when the output value from the output unit 28 indicates the gear position other than the gear position stored in the storage 30, the processor 31 makes the display 32 display this result in a blinking manner.

In the condition in which the displayed result blinks on the display 32, whether the neutral position is established is determined on the basis of the output value from the output unit 28, in a fifth step S5. If it is determined that the neutral position is established, the process advances to the third step S3, and the processor 31 makes the display 32 display that the current gear position is the neutral position.

Figure 4:
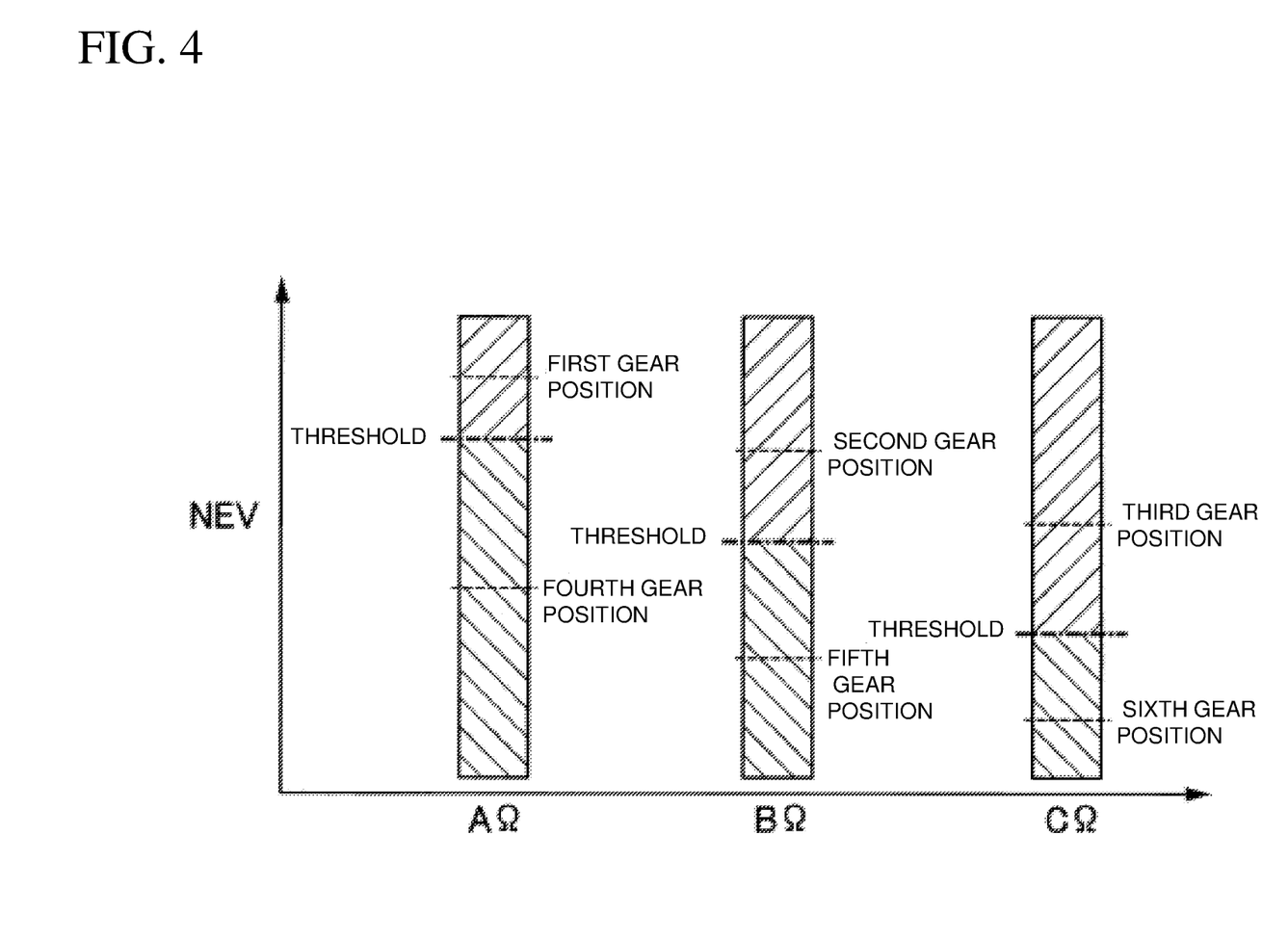
FIG. 4 is a map for determining a gear position on the basis of an output value from an output unit, a number of rotation of an engine, and a speed of a vehicle.

If it is not determined that the neutral position is established in the fifth step S5, the process advances to a sixth step S6, and the processor 31 determines whether the vehicle is traveling. If it is determined that the vehicle is not traveling, the process returns to the fourth step S4. Otherwise, if it is determined that the vehicle is traveling, the processor 31 determines the gear position on the basis of the output value from the output unit 28, the number of rotation of the engine, and the speed of the vehicle. In order to determine the gear position, a map as illustrated in FIG. 4 is set. The map shows a set threshold of an indicator NEV that is determined by the number of rotation of the engine and the speed of the vehicle, for the output value from the output unit 28, that is, for each of the first resistance value A ($\Omega$), the second resistance value B ($\Omega$), and the third resistance value C ($\Omega$). In the condition in which the first resistance value A ($\Omega$) is output from the output unit 28, the threshold determines whether the gear position is the first gear position or the fourth gear position. In the condition in which the second resistance value B ($\Omega$) is output from the output unit 28, the threshold also determines whether the gear position is the second gear position or the fifth gear position. In the condition in which the third resistance value C ($\Omega$) is output from the output unit 28, the threshold determines whether the gear position is the third gear position or the sixth gear position.

When the gear position is determined in a seventh step S7, the determined gear position is displayed on the display 32 in an eighth step S8.

As shown in FIG. 2, the electric power supply unit 42 receives a signal from a main switch 44 of the vehicle. The electric power supply unit 42 stops the supply of electric power to the processor 31 when a predetermined time, for example, 15 minutes, has passed after the main switch 44 is turned off.

Next, effects of this embodiment will be described. The gear position measuring device includes the switch 18, the output unit 28, the storage 30, and the processor 31. The switch 18 has the multiple individual contacts respectively corresponding to the multiple gear positions. The multiple individual contacts are changed from an off-state to an on-state in accordance with the selective establishment of the multiple gear positions. More specifically, the switch 18 includes the individual contact 19 for the first gear position, the individual contact 20 for the neutral position, the individual contact 21 for the second gear position, the individual contact 22 for the third gear position, the individual contact 23 for the fourth gear position, the individual contact 24 for the fifth gear position, and the individual contact 25 for the sixth gear position. The output unit 28 includes the circuits so that the individual contacts for the gear positions of each of the multiple gear position groups are connected to the same circuit, thereby being able to output from the circuits that are different for each of the multiple gear position groups. The multiple gear position groups respectively include at least two of the multiple gear positions. The storage 30 stores a determined gear position. When the output value from the output unit 28 is changed, the processor 31 determines a current gear position on the basis of the gear position stored in the storage 30 and the multiple gear positions indicted by the output value from the output unit 28. This structure requires only circuits for the respective gear position groups, thereby enabling reduction in dimensions and in cost compared with an existing device having circuits for respective gear positions.

The gear position measuring device also includes the display 32, which displays the determined gear position, and the electric power supply unit 42, which starts and stops the supply of electric power to the processor 31. The processor 31 makes the storage 30 store the determined gear position and also makes the display 32 display the determined gear position. The processor 31 is activated by turning on the electric power supply unit 42 to perform the following operations. That is, when the output value from the output unit 28 corresponds to the gear position stored in the storage 30, the processor 31 determines the gear position that is stored in the storage 30, as the current gear position. When the output value from the output unit 28 indicates the gear position other than the gear position stored in the storage 30, the processor 31 makes the display 32 display this result. Thus, the storage 30 stores the current gear position, thereby enabling a correct determination of the gear position at the next time when the output value is changed. Moreover, determining the gear position at the time of starting the supply of electric power to the processor 31 enables notifying a user that the current gear position is undetermined, when the gear position is changed by changing gears after the supply of electric power is stopped.

Among the multiple gear positions, one gear position is set as a reference gear position. In this embodiment, the neutral position is set as the reference gear position. The output unit 28 includes the circuit for one of the multiple individual contacts of the switch 18, which corresponds to the reference gear position. In this embodiment, this individual contact is the individual contact 20 for the neutral position. This circuit outputs an output value that is different from those from the multiple circuits for the respective multiple gear position groups. The processor 31 makes the display 32 display the reference gear position when the output unit 28 outputs the output value indicating the reference gear position. Thus, setting the reference gear position for which the output value is independently set enables more correct determination and displaying of the gear position.

The electric power supply unit 42 stops the supply of electric power to the processor 31 when a predetermined time, for example, 15 minutes, has passed after the main switch 44 is turned off. Conversely, the electric power supply unit 42 continues the supply of electric power to the processor 31 until the predetermined time passes even after the main switch 44 is turned off. Thus, for example, even in a case in which the gear position is shifted to the first gear position when a user notices a tilt of a road surface after the user stops the vehicle by changing the gear position to the neutral position, the storage 30 stores the first gear position as the current gear position. This avoids inconsistency between the gear position stored in the storage 30 and a gear position when the main switch 44 is turned on by the user next time.

The processor 31 is also able to determine the current gear position on the basis of the output value from the output unit 28 and a number of rotation of the power source mounted on the vehicle and the speed of the vehicle. That is, the gear position is able to be determined on the basis of the state of the vehicle that is traveling. This structure enables storing and displaying the gear position more correctly even when the vehicle starts running while the gear position is still not determined or even when the determination of the gear position is failed during traveling.

The output unit 28 includes the first circuit for the neutral position, which is the reference gear position, the second circuit for the first gear position group, the third circuit for the second gear position group, and the fourth circuit for the third gear position group. The first gear position group includes the first gear position and the gear position of an integer multiple of (1+3). The second gear position group includes the second gear position and the gear position of an integer multiple of (2+3). The third gear position group includes the third gear position and the gear position of an integer multiple of (3+3). Thus, the output unit 28 provides an output value that is different depending on whether the gear position is shifted up or down by one from the current gear position in changing gear positions sequentially, using the least number of the circuits.

The second to the fourth circuits have the resistance values that are different from each other and output the predetermined respective resistance values as output values. That is, the output value is changed by using such a simple structure.

Moreover, the switch 18 turns on and off the multiple individual contacts in accordance with rotation of the shift drum 16 of the sequential transmission 5. Thus, the gear position is sequentially changed in accordance with rotation of the shift drum 16, thereby enabling more reliable measurement of the gear position.

The above describes the embodiment of the present invention. However, the present invention is by no means limited to the embodiment described above and may undergo various design modifications without departing from the scope of the present invention.

REFERENCE SIGNS LIST 5 sequential transmission
16 shift drum
18 switch
19, 20, 21, 22, 23, 24, 25 individual contact
28 output unit
30 storage
31 processor
32 display
42 electric power supply unit
44 main switch

What is claimed is:

1. A gear position measuring device for a sequential transmission having multiple gear positions that are able to be selectively established, the gear position measuring device configured to measure the gear position of the sequential transmission and comprising:
   a switch including multiple individual contacts respectively corresponding to the multiple gear positions, and the multiple individual contacts being changed from an off-state to an on-state in accordance with the selective establishment of the multiple gear positions: an output unit including circuits so that the individual contacts for the gear positions of each of multiple gear position groups are connected to the same circuit, thereby being able to output from the circuits that are different for each of the multiple gear position groups, and the multiple gear position groups respectively including at least two of the multiple gear positions;
   a storage that stores a determined gear position;
   a processor that, when an output value from the output unit is changed, determines a current gear position on the basis of the gear position stored in the storage and the multiple gear positions indicated by the output value from the output unit;
   a display that displays a determined gear position;
   an electric power supply unit that starts and stops supply of electric power to the processor,
   wherein the processor makes the storage store the determined gear position and also makes the display display the determined gear position, the processor is activated by turning on the electric power supply unit to:
      when an output value from the output unit corresponds to the gear position stored in the storage, determine the gear position that is stored in the storage, as a current gear position; and
      when an output value from the output unit indicates the gear position other than the gear position stored in the storage, make the display display this result;
   wherein, among the multiple gear positions of the sequential transmission, one gear position is set as a reference gear position, the output unit includes a circuit for one of the individual contacts of the switch, which corresponds to the reference gear position, the circuit outputs an output value that is different from those from the multiple circuits for the respective multiple gear position groups, the processor makes the display display the reference gear position when the output unit outputs an output value indicating the reference gear position.

2. The gear position measuring device for the sequential transmission according to claim 1, wherein the electric power supply unit stops the supply of electric power to the processor when a predetermined time has passed after a main switch is turned off.

3. The gear position measuring device for the sequential transmission according to claim 2, wherein the processor also determines a current gear position on a basis of an output value from the output unit, a number of rotation of a power source mounted on a vehicle, and a speed of the vehicle.

4. The gear position measuring device for the sequential transmission according to claim 2, wherein the switch turns on and off the multiple individual contacts in accordance with rotation of a shift drum of the sequential transmission.

5. The gear position measuring device for the sequential transmission according to claim 1, wherein the processor also determines a current gear position on a basis of an output value from the output unit, a number of rotation of a power source mounted on a vehicle, and a speed of the vehicle.

6. The gear position measuring device for the sequential transmission according to claim 5, wherein the switch turns on and off the multiple individual contacts in accordance with rotation of a shift drum of the sequential transmission.

7. The gear position measuring device for the sequential transmission according to claim 1, wherein the output unit includes
- a first circuit for a neutral position, which is the reference gear position,
- a second circuit for a first gear position group including a first gear position and a gear position of an integer multiple of (1+3),
- a third circuit for a second gear position group including a second gear position and a gear position of an integer multiple of (2+3), and
- a fourth circuit for a third gear position group including a third gear position and a gear position of an integer multiple of (3+3).

8. The gear position measuring device for the sequential transmission according to claim 7, wherein the second to the fourth circuits have resistance values that are different from each other and output predetermined respective resistance values as output values.

9. The gear position measuring device for the sequential transmission according to claim 8, wherein the switch turns on and off the multiple individual contacts in accordance with rotation of a shift drum of the sequential transmission.

10. The gear position measuring device for the sequential transmission according to claim 7, wherein the switch turns on and off the multiple individual contacts in accordance with rotation of a shift drum of the sequential transmission.

11. The gear position measuring device for the sequential transmission according to claim 1, wherein the switch turns on and off the multiple individual contacts in accordance with rotation of a shift drum of the sequential transmission.

12. A gear position measuring device for a sequential transmission having multiple gear positions that are able to be selectively established, the gear position measuring device configured to measure the gear position of the sequential transmission and comprising:
- a switch including multiple individual contacts respectively corresponding to the multiple gear positions, and the multiple individual contacts being changed from an off-state to an on-state in accordance with the selective establishment of the multiple gear positions: an output unit including circuits so that the individual contacts for the gear positions of each of multiple gear position groups are connected to the same circuit, thereby being able to output from the circuits that are different for each of the multiple gear position groups, and the multiple gear position groups respectively including at least two of the multiple gear positions;
- a storage that stores a determined gear position;
- a processor that, when an output value from the output unit is changed, determines a current gear position on the basis of the gear position stored in the storage and the multiple gear positions indicated by the output value from the output unit; and
- wherein the switch turns on and off the multiple individual contacts in accordance with rotation of a shift drum of the sequential transmission.

* * * * *